Patented Oct. 9, 1951

2,570,389

UNITED STATES PATENT OFFICE 2,570,389

ACETONE RESIN

Conrad F. Schrimpe, Woodbridge, N. J., assignor, by mesne assignments, to Union Carbide and Carbon Corporation, a corporation of New York No Drawing. Application July 18, 1947, Serial No. 761,991

6 Claims. (Cl. 260—64)

This invention relates to condensation products of acetone with formaldehyde; depending on proportions, catalysts and reaction conditions, products can be obtained as liquids, resins or amorphous powders. Since acetone has six active hydrogens, a wide variety of products is possible by reaction with formaldehyde, and this reactivity may have prompted the recommendation of high percentages of formaldehyde (7 moles to one mole of acetone) found in the prior art; high formaldehyde ratios, however, lead to water-soluble products that are rendered insoluble or infusible with difficulty.

For resinous products that can be made infusible and so commercially useful, it has now been found that the upper limit of the formaldehyde ratio is substantially two moles to one mole of acetone; in fact the preferred resins are those made from approximately equimolecular proportions and even with an excess of acetone, though the latter means a reduction in yield and added cost of recovery. The ideal thermosetting resin appears to be the condensation product having a chain of alternate acetone groups connected by methylene groups:

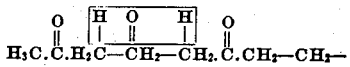

Another mole of formaldehyde apparently adds on as methylol groups to yield the intermediate:

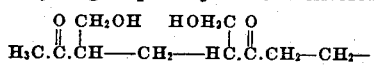

In the hardening step of the intermediate to the final infusible state methylol groups appear to react with active hydrogens in neighboring chains to form cross-linking bridges with the separation of water.

The intermediate-forming condensation is an equilibrium reaction that does not go to completion, for unreacted acetone can easily be eliminated in the dehydration, but excess formaldehyde remains firmly either in solid solution or attached as methylol groups during dehydration and hardening to the final hardened state. Unreacted formaldehyde and excess methylol groups impair the properties of the final resin, and it has been found that these can be best eliminated or minimized by condensing in molar proportions to yield about 0.7 to 0.8 part by weight of resin for each part of acetone with a recovery of about 45 per cent of unreacted acetone in the dehydration.

For the condensation the catalyst selected has a directive action; acids inhibit the reaction of acetone and formaldehyde, while bases are strong promoters. The inorganic alkali and alkali earth metal hydroxides and salts usually recommended, are, however, unsuitable for other reasons: caustic soda and potash cause violent reactions at the beginning, but the reactions soon subside with a change in the pH to the acid side, and the same result follows subsequent additions of the caustic; apparently the Cannizzaro reaction of the inorganic base with formaldehyde takes place to interfere with and retard or suppress the condensation.

For control and direction of the condensation to yield useful hardening resin products, it has been found that the pH of the reaction mass and the maintenance of the pH within a definite range during the condensation is of primary importance. If the reaction is initiated and the bulk of reaction occurs at a pH materially below 9.5 or 10, an under-reacted and water-soluble resin results that has little utility. On the other hand, with a pH of the mass above 11.5, the tendency is a continuation of the reaction to a useless infusible product which is difficult to prevent. In practice it has been found that the most satisfactory resins are those whose condensations take place at a pH of about 10.0 to 11.5, preferably 10.5 to 11, in which pH region heat-hardening intermediates form that are water-insoluble but spirit-soluble.

For accomplishing the foregoing object of a selected pH range, it has been found that secondary alkyl amines and alkylene imines that are soluble in the reaction mass generally are effective; the Cannizzaro reaction is not a disturbing factor. The preferred amines are the lower dialkylamines, particularly dimethyl and diethyl amines that are readily available, relatively low in molecular weight so that little by weight is needed for a given pH, and volatilizable or low in boiling point and therefore quickly eliminatable in the dehydration of the mass without the danger of catalyzing the conversion of the resin to a useless infusible state. The alkylene imines, however, have in common with the dialkyl imines the useful characteristic properties of initially establishing the pH and maintaining the pH throughout the reaction and in addition causing a slow induction period, during which a portion of the acetone reacts, and then a quiet acceleration of the reaction to completion on standing; such alkylene imines include the five- and six-membered cyclic alkylene monoimines and diimines (pyroline, pyrolidine, piperidine, piperazine, etc.), though these are in general high-boiling and substantially nonvolatile, so that the pH builds up during dehydration and an initially low pH is required for compensation (or alternatively neutralization before or during dehydration) to avoid gelation.

A most surprising and useful result, moreover, follows with a secondary amine or an alkylene imine catalyst, and that is an increase in the pH merely upon standing. The initial pH is not much above about 9 within the range of amounts of catalyst normally added, i. e. the mass is in the pH zone yielding water-soluble resins of little utility; but upon standing at room temperature overnight, it is found that the pH rises into the region of about 10 to 11.5, varying with the concentration of catalyst, or into the zone providing resin intermediates of the spirit-soluble type. The same transfer or pH rise obtained on standing also occurs upon refluxing the reaction mass. On further prolonged standing, the reaction tends to continue with precipitation of resin at a rate approximately in proportion to the amount of catalyst present.

Upon dehydration of the intermediate product, with or without vacuum application, the unreacted acetone first comes over followed by the water fraction which carries with it a large part of the volatile base catalyst so that the pH becomes less and below the hardening pH as the dehydration progresses; the resin so dehydrated has excellent keeping properties without hardening. For hardening it is only necessary to restore the pH to about 10.5–11 at the time of use, and this is preferably accomplished by means of high boiling substituted amines, diamines and triamines, of which piperidine, piperazine, guanidine and polyethylene amines and substitution products (propylene diamine, diethylene triamine, etc.) are representative; these remain in the hardened resin. The resin hardens under the customary conditions of heat and pressure, i. e., about 135° C. and 500–1000 pounds' pressure, at a speed commensurate with phenol-formaldehyde resins.

The prime usefulness of the resin is found in the field of bonding laminations of paper for the manufacture of core stock, but wood veneers, cloth, etc. can be bonded as well. While the resin operates like a heat-hardening phenol-formaldehyde resin, without requiring any material change in proportions or conditions for bonding, the core stock obtained is markedly superior to the phenolic resin stock in caustic resistance. The water absorption is higher but there is no swelling to cause disruption, and apparently for that reason there is no tendency to delaminate or become pimply, and the laminated made from it can be used for counter and table tops that are subject to moisture variation. While not free from color, there is no color change or darkening. The composition also is useful for coatings similar to phenolic resins.

The invention is illustrated by the following examples, but not limited thereto.

*Example 1*

A flask was charged with a 1:1 molar proportion of 3480 grams of acetone, 4800 grams of formalin and 90 cc. of a 25 per cent solution of dimethylamine in water, the mass having a pH of about 9. After standing for several hours the flask began to warm, indicating a reaction; the flask was cooled with water to avoid loss of acetone. After about 2 hours of cooling, the temperature reached about 70°–80° C. and the reaction was then allowed to proceed without further cooling, the mass becoming brown or red-brown in color. On standing overnight, the mass was a deep brown color with a pH of about 10.5 to 11.0, whereupon it was slowly distilled to about 80° C. and about 1700 grams of 80 per cent acetone was recovered. Continued distillation to about 105° C. eliminated water including the water of reaction together with a small amount of remaining acetone and formaldehyde and much of the catalyst. A further distillation under a 28 inch vacuum to 140° C. separated a low order condensation fraction, which in practice is added to the next run. The result was an overall yield of about 1.25 pounds of spirit-soluble resin intermediate per pound of acetone, the recovered acetone being rereacted, or about 0.55 pound of resin for each pound of formalin.

*Example 2*

The foregoing example was repeated with the same proportions of ingredients and reacting conditions, except that an equivalent amount of diethylamine was substituted as the catalyst. The results were substantially the same as in Example 1.

*Example 3*

A spirit-soluble resin was made by mixing (in the proportion 1 mole of acetone to 2 moles of formaldehyde) 11,280 grams of acetone with 31,220 grams of formalin, 800 cc. of 25 per cent water-solution of dimethylamine, giving an initial pH of about 9. During the initial active stage of about 2 hours it was necessary to cool the mass for control. The mass was then allowed to stand at room temperature overnight when the pH was found to be 10.5 to 11. A slow distillation to about 80° C. separated 3030 grams of 80 per cent acetone in water, and the distillation was then continued to 105° C. which removed most of the water, some formaldehyde, some low order condensation product and part of the amine catalyst. Upon applying a 28 inch vacuum and continuing the distilling up to 140° C., 6940 grams of a distillable low order condensation product came over, leaving 14,800 grams of useful resin which was amber in color and very viscous. It is possible in this reaction to obtain on a weight basis from about 1.3 to 1.4 parts of resin for each part of acetone; about 20 per cent of the acetone is then recovered unreacted, and there is present in the condensation product at least about 2 per cent of free formaldehyde as well as loosely held methylol groups that depreciate the useful properties of the resin. The resin does not measure up to that of Example 1 as a laminating resin, and this is apparently due to the presence of the free formaldehyde and the methylol groups.

The foregoing examples are illustrative of the preferred dialkyl amines, which are removed in the distillation as catalysts. The following example discloses the procedure for a non-volatile alkylene imine that remains in the intermediate during dehydration.

*Example 4*

There was mixed in a reaction vessel 3480 grams of acetone, 4800 grams of formalin and 45 cc. of piperidine; the mass was allowed to react on standing. The amount of piperidine added gave an initial pH of 8.87 which rose to 9.42 and eventually to 10.45 at the completion of the condensation. The mass was distilled to 80° C. yielding 1755 grams of acetone, and the distillation was continued atmospherically to 105° C. to remove water; thereupon the mass was vacuum distilled as before with a separation of 1600 grams of a low order condensate, water and formaldehyde. The resin yield was 2500 grams; it was very viscous and reactive.

It is to be noted that with piperidine added to give a pH of 8.87, the pH arose to 10.45. This was found to be just about the limit for separating a useful fusible resin, because the piperidine remaining in the solution became concentrated during dehydration to increase the pH; therefore the lower initial pH value was necessitated.

The diimines, such as piperazine, are less effective as catalysts, though they have two imine groups in the ring; this moderation of the catalytic action is apparently due to a weakening effect caused by the second imine group. Larger amounts are therefore required for establishing the pH, though in other respects they act like piperidine.

By "formalin" in the foregoing examples is meant the aqueous solution containing 37 per cent formaldehyde; the anhydrous polymers, such as paraformaldehyde, however, can be substituted, for the reaction proceeds in the same manner. The condensation product remaining after distillation in all instances was a viscous liquid at room temperature. Essential to the condensation and also to the hardening is the maintenance of basic conditions throughout.

To demonstrate the properties of laminated stock made from the resinous product of this invention, comparative samples (made as described above) were prepared, one set with an alcohol solution of the acetone resin described in Example 1 having added 0.3 per cent of diethylenetriamine based on solids as a hardening agent and another set with an alcohol solution of a phenol-formaldehyde resin normally sold for making laminated stock; the latter set had about 2 per cent higher resin content. These sets were tested for moisture and caustic resistance by immersion in water and in 5 per cent caustic soda for 96 hours; the gain in weight was measured with the following results:

| Resin | Per Cent Moisture absorbed | Per Cent Caustic absorbed |
|---|---|---|
| Phenol | 1.1-1.2 | 27.0-27.5 |
| Acetone | 6.4-6.7 | 7.9-9.6 |

Since the primary object and outstanding utility of the invention lies in the spirit-soluble type of product, the foregoing description is directed to that type. The catalysts, however, can also be used in the preparation of water-soluble products by maintaining the pH of the condensation below about 9.5. As indicated in the opening statement, the water-soluble form is more slowly transformed to the useful thermosetting type by the addition of hardening agents because of the shorter chain molecules present for laminating purposes they are likely to ooze out in the pressing operation.

The products of condensation can be mixed with other resins, such as the phenol-formaldehyde base-catalyzed resins. When both are heat-hardenable, or made so by hardening agents, homogeneous products result upon hardening to the final form.

What is claimed is:

1. Process of preparing a resinous product which comprises condensing at a pH between 10 and 11.5 acetone with formaldehyde in reacting proportions of from about one to two moles of formaldehyde for each mole of acetone in the presence of a soluble catalyst selected from the group consisting of secondary dialkyl amines, pyrroline, pyrrolidine, piperidine and piperazine, said catalyst being present in amount imparting an initial pH of about 9 to the reaction mixture of acetone and formaldehyde.

2. Process of preparing a resinous product which comprises condensing at a pH between 10 and 11.5 acetone with formaldehyde in reacting proportions of from about one to two moles of formaldehyde for each mole of acetone in the presence of a volatilizable secondary dialkylamine in an amount imparting an initial pH of about 9 to the reaction mixture of acetone and formaldehyde.

3. Process of preparing a resinous product which comprises condensing at a pH between 10 and 11.5 acetone with formaldehyde in substantially equimolecular proportions in the presence of dimethylamine in an amount securing an initial pH of about 9 to the reaction mixture of acetone and formaldehyde.

4. Process of preparing a resinous product which comprises condensing at a pH between 10 and 11.5 acetone with formaldehyde in reacting proportions of from about one to two moles of formaldehyde for each mole of acetone in the presence of a soluble catalyst selected from the group consisting of secondary dialkyl amines, pyrroline, pyrrolidine, piperidine and piperazine, said catalyst being present in amount imparting an initial pH of about 9 to the reaction mixture of acetone and formaldehyde, and adding a hardening catalyst to the product for heat-reactivity.

5. Process of preparing a resinous product which comprises condensing a reaction mixture of a mol of acetone and between one and two mols formaldehyde at a pH between 10 and 11.5 in the presence of a catalyst selected from the group consisting of secondary dialkylamines, pyrroline, pyrrolidine, piperidine and piperazine and in an amount producing an initial pH of about 9 in the reaction mixture of acetone and formaldehyde, continuing the condensation reaction until a fusible, water-insoluble, alcohol-soluble reaction product is obtained and dehydrating said reaction product.

6. Process of preparing a fusible resinous product which comprises condensing a reaction mixture of acetone and formaldehyde in reacting proportions of from one to two mols formaldehyde for each mol of acetone at a pH between 10 and 11.5 in the presence of a catalyst selected from the group consisting of secondary dialkylamines, pyrroline, pyrrolidine, piperidine and piperazine, said catalyst being added to the reaction mixture in amount securing an initial pH of about 9., continuing the condensation reaction until a fusible, water-insoluble, resin is obtained, dehydrating the resin and adjusting the pH of the resin below 10.5 to prevent hardening of the resin.

CONRAD F. SCHRIMPE.

REFERENCES CITED

The following references are of record in the file of this patent:

UNITED STATES PATENTS

| Number | Name | Date |
|---|---|---|
| 1,502,945 | Ellis | July 29, 1934 |
| 2,191,802 | Novotny et al. | Feb. 27, 1940 |
| 2,196,452 | Hopff | Apr. 9, 1940 |
| 2,272,783 | Treboux | Feb. 10, 1942 |
| 2,325,376 | D'Alelio | July 27, 1943 |
| 2,442,989 | Sussman | June 8, 1948 |